United States Patent
Marom et al.

[11] Patent Number: 5,331,143
[45] Date of Patent: * Jul. 19, 1994

[54] OPTICAL SCANNER USING AN AXICON AND AN APERTURE TO ASPHERICALLY FORM THE SCANNING BEAM

[75] Inventors: Emanuel Marom; Joseph Katz, both of Stony Brook, N.Y.

[73] Assignee: Symbol Technologies, Inc., Bohemia, N.Y.

[*] Notice: The portion of the term of this patent subsequent to Jan. 14, 2009 has been disclaimed.

[21] Appl. No.: 936,472

[22] Filed: Aug. 28, 1992

[51] Int. Cl.⁵ .............................................. G06K 7/10
[52] U.S. Cl. ................................... 235/472; 235/462; 359/196; 359/214
[58] Field of Search ................ 235/472, 462; 250/236, 250/235, 234; 359/196, 213, 214

[56] References Cited

U.S. PATENT DOCUMENTS

| | | | |
|---|---|---|---|
| 5,156,943 | 10/1992 | Whitney | 430/321 |
| 5,164,584 | 11/1992 | Wike, Jr. et al. | 250/216 |
| 5,202,784 | 4/1993 | Reddersen | 250/236 |

FOREIGN PATENT DOCUMENTS 0360581 3/1990 European Pat. Off. .

*Primary Examiner*—Donald Hajec
*Assistant Examiner*—Adrian Young

[57] ABSTRACT

The use of linear axicons or similar optical elements in a bar code scanner produces a scanning spot of a size correlated generally with dimensions of features of the scanned information, wherein the spot size remains substantially constant for varying distances between the scanner and the symbol over a substantial range of distances. Optical elements of this type produce a diffraction pattern comprising a central lobe and a number of rings surrounding the central lobe. An aperture is provided to limit the beam and thus the number of rings in the pattern which actually reach the symbol during scanning. The extent of the limited beam and the phase front tilt angle produced by the optical element are chosen to produce a desired resolution, which relates to the density of symbols the scanner is to read, and to produce a desired working range. The invention also provides a modular light emitting device including a universal light emitting module and an optical assembly, including the axicon and aperture, mounted on the module to adapt the optical characteristics of light from the module to conform to the requirements of a particular scanning application.

29 Claims, 12 Drawing Sheets

| AXICON WITH $\beta$ = 0.005 RAD [OPTIMUM FOR 2mils SYMBOLS] | | | | |
|---|---|---|---|---|
| INPUT RADIUS $R_o$ (mm) | 2 | 1 | 0.5 | .25 |
| GEOMETRIC LENGTH Zd (mm) | 400 | 200 | 100 | 50 |
| PEAK LOCATION (THEOR) $\frac{2}{3}$ Zd (mm) | 267 267 | 133 133 | 67 67 | 33 33 |
| $M \equiv R_o \beta/\lambda$ | 15 | 7.5 | 3.7 | 1.9 |
| NUMBER OF BESSEL RINGS (L $\equiv$ CENTRAL LOBE) | L+9 | L+4 | L+1.5 | L+0.5 |

FIG.9A

| COMPUTER SIMULATION RESULTS FOR C=0.12 | | | | | |
|---|---|---|---|---|---|
| PEAK LOCATION @ 2 mils | | 325 | 150 | 70 | 30 |
| (MTF) max | 2 mils | .04 | .11 | .15 | .30 |
| | 4 mils | .10 | .18 | .32 | .56 |
| | 10 mils | .21 | .35 | .63 | .84 |
| WORKING RANGE [INCHES] | 2 mils | – | 6-6 | 2.4-3 | 0.4-1.9 |
| | 4 mils | – | 5.5-6.5 | 1-3.5 | 0.4-1.9 |
| | 10 mils | 8.5-14 | 4-7.5 | 0.5-4 | 0-2.6 |

FIG.9B

| AXICON WITH $\beta$ = 0.002 RAD [OPTIMUM FOR 5mils SYMBOLS] | | | | |
|---|---|---|---|---|
| INPUT RADIUS $R_0$ (mm) | 2 | 1 | 0.5 | 0.25 |
| GEOMETRIC LENGTH $Z_d$ (mm) | 1000 | 500 | 250 | 125 |
| PEAK LOCATION (THEOR) $\frac{2}{3} Z_d$ (mm) | 667 667 | 333 333 | 167 167 | 83 83 |
| $M \equiv R_0 \beta / \lambda$ | 6 | 3 | 1.5 | 0.75 |
| NUMBER OF BESSEL RINGS (L ≡ CENTRAL LOBE) | L+3 | L+1.2 | L+0.2 | < L |

FIG.10A

| COMPUTER SIMULATION RESULTS FOR C=0.12 | | | | | |
|---|---|---|---|---|---|
| PEAK LOCATION @ 5 mils | | 725 | 300 | 150 | 60 |
| (MTF) max | 4 mils | .10 | .23 | .35 | .47 |
| | 5 mils | .11 | .21 | .42 | .56 |
| | 10 mils | .19 | .32 | .63 | .77 |
| | 15 mils | .27 | .48 | .75 | .86 |
| | 20 mils | .33 | | .83 | .90 |
| WORKING RANGE [INCHES] | 4 mils | – | 6.7–15.7 | 3–9 | 1.4–4.5 |
| | 5 mils | – | 6.7–15.7 | 3–10 | 1–5.5 |
| | 10 mils | 25–32.5 | 5.5–16.5 | 2.5–10 | 0–>7 |
| | 15 mils | 21.5–34 | 5.5–18.5 | 0.5–11.4 | 0–>8 |
| | 20 mils | <12–37 | 4.7–20.4? | 0.5–13.8? | 0–>9 |

FIG.10B

| AXICON WITH $\beta$ = 0.001 RAD [OPTIMUM FOR 10mils SYMBOLS] | | | | |
|---|---|---|---|---|
| INPUT RADIUS $R_0$ (mm) | 2 | 1 | 0.5 | 0.25 |
| GEOMETRIC LENGTH $Z_d$ (mm) | 2000 | 1000 | 500 | 250 |
| PEAK LOCATION (THEOR) $\frac{2}{3} Z_d$ (mm) | 1333<br>1333 | 667<br>667 | 333<br>333 | 167<br>167 |
| $M \equiv R_0 \beta/\lambda$ | 3 | 1.5 | 0.75 | 0.37 |
| NUMBER OF BESSEL RINGS (L $\equiv$ CENTRAL LOBE) | L+1.2 | L+0.2 | < L | << L |

FIG.11A

| COMPUTER SIMULATION RESULTS FOR C=0.12 | | | | | |
|---|---|---|---|---|---|
| PEAK LOCATION @ 10 mils | | 1300 | 600 | 250 | <100 |
| (MTF) max | 10 mils<br>16 mils<br>20 mils<br>30 mils | .21<br>.31<br>.35<br>.45 | .43<br>.56<br>.63<br>.72 | .56<br>.70<br>.76<br>.82 | >.65<br>>.78<br>>.83<br>>.88 |
| WORKING RANGE [INCHES] | 10 mils<br>16 mils<br>20 mils<br>30 mils | 39-66<br>35-69<br>27.5-69<br>27.5-71.5 | 9.4-39<br>9.4-39<br>9.4-39<br>6-39 | 2-23<br>0-35<br>0-44<br>0.55 | 0-11<br>0->12<br>0->12<br>0->12 |

FIG.11B

EXPERIMENTAL RESULTS

| INPUT RADIUS $R_o$ (mm) | | 1 | 0.5 |
|---|---|---|---|
| WORKING RANGE [INCHES] | 10 mils | 15-44 | 6-22 |
| | 16 mils | 15-53 | 6-41 |
| | 20 mils | 14-59 | 6-48 |
| | 30 mils | 15-57 | 6-62 |

FIG. 11C

| AXICON WITH $\beta$ = 0.000625 RAD [OPTIMUM FOR 16mils SYMBOLS] | | | | |
|---|---|---|---|---|
| INPUT RADIUS $R_o$ (mm) | 2 | 1.5 | 1 | 0.75 |
| GEOMETRIC LENGTH Zd (mm) | 3200 | 2400 | 1600 | 1200 |
| PEAK LOCATION (THEOR) $\frac{2}{3}$ Zd (mm) | 2133<br>2133 | 1600<br>1600 | 1067<br>1067 | 800<br>800 |
| $M \equiv R_o \beta/\lambda$ | 1.87 | 1.40 | 0.93 | 0.70 |
| NUMBER OF BESSEL RINGS (L $\equiv$ CENTRAL LOBE) | L+0.5 | L+0.2 | < L | < L |

FIG.12A

| COMPUTER SIMULATION RESULTS FOR C=0.12 | | | | | |
|---|---|---|---|---|---|
| PEAK LOCATION @ 16 mils | | 1850 | 1300 | 800 | 600 |
| (MTF) max | 10 mils<br>16 mils<br>20 mils<br>30 mils | .20<br>.37<br>.42<br>.49 | .23<br>.45<br>.50<br>.59 | .30<br>.52<br>.60<br>.68 | .35<br>.57<br>.65<br>.73 |
| WORKING RANGE [INCHES] | 10 mils<br>16 mils<br>20 mils<br>30 mils | 59–89<br>35–114<br>35–114<br>35–114 | 38–67<br>31.5–98<br>28–98<br>24–98 | 22–45<br>16.5–71<br>14–79<br>8–79 | 14–33<br>9–53<br>6–63<br>2–71 |

FIG.12B

OPTICAL SCANNER USING AN AXICON AND AN APERTURE TO ASPHERICALLY FORM THE SCANNING BEAM

TECHNICAL FIELD

This invention relates to optical scanning devices, such as bar code scanners, and more particularly to a laser imaging system for generating a laser beam scan pattern with an extended depth of focus or working range and which is effective for scanning symbols of a wide range of densities.

BACKGROUND ART

Optically encoded information, such as bar codes, have become quite common. A bar code symbol consists of a series of light and dark regions, typically in the form of rectangles. The widths of the dark regions, the bars, and/or the widths of the light spaces between the bars indicate the encoded information. A specified number and arrangement of these elements represent a character. Standardized encoding schemes specify the arrangements for each character, the acceptable widths and spacings of the elements, the number of characters a symbol may contain or whether symbol length is variable, etc. The known symbologies include, for example, UPC/EAN, Code 128, Codabar, and Interleaved 2 of 5.

Readers and scanning systems electro-optically decode each symbol to provide multiple alphanumerical characters that typically are descriptive of the article to which the symbol is attached or some characteristic thereof. Such characters are typically represented in digital form as an input to a data processing system for applications in point-of-sale processing, inventory control, and the like, Scanning systems of this general type have been disclosed, for example, in U.S. Pat. Nos. 4,251,798; 4,360,798; 4,369,361; 4,387,297; 4,409,470 and 4,460,120, all of which have been assigned to Symbol Technologies, Inc., the assignee of this application.

To decode a bar code symbol and extract a legitimate message using such optical scanners, a bar code reader scans the symbol to produce an analog electrical signal representative of the scanned symbol. A variety of scanning devices are known. The scanner could be a wand type reader including an emitter and a detector fixedly mounted in the wand, in which case the user manually moves the wand across the symbol. Alternatively, an optical scanner scans a light beam such as a laser beam across the symbol, and a detector senses the light reflected from the symbol. In either case, the detector senses reflected light from a spot scanned across the symbol, and the detector provides the analog scan signal representing the encoded information.

A digitizer processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The threshold level effectively defines what portions of a signal the reader will recognize as a bar or a space.

The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

Different bar codes have different information densities and contain a different number of elements in a given area representing different amounts of encoded data. The denser the code, the smaller the elements and spacings. Printing of the denser symbols on an appropriate medium is exacting and thus is more expensive than printing low resolution symbols. The density of a bar code symbol can be expressed in terms of the minimum bar/space width called also "module size" or as a "spatial frequency" of the code, which is the inverse of twice the bar/space width.

A bar code reader typically will have a specified resolution, often expressed by the module size that is detectable by its effective sensing spot. For optical scanners, for example, the beam spot size could be larger than approximately the minimum width between regions of different light reflectivities, i.e., the bars and spaces of the symbol. The resolution of the reader is established by parameters of the emitter or the detector, by lenses or apertures associated with either the emitter or the detector by angle of beam inclination, by the threshold level of the digitizer, by programming in the decoder, or by a combination of two or more of these elements. In a laser beam scanner the effective sensing spot typically corresponds closely to the size of the beam at the point it impinges on the bar code. The photodetector will effectively average the light detected over the area of the sensing spot.

The region within which the bar code scanner is able to decode a bar code is called the effective working range of the scanner. Within this range, the spot size is such as to produce accurate readings of bar codes for a given bar code line density. The working range relates directly to the focal characteristics of the scanner components and to the module size of the bar code.

Typically, an optical scanner includes a light source, such as a gas laser or semiconductor laser, that generates the light beam. The use of semiconductor lasers as the light source in scanner systems is especially desirable because of their small size, low cost and low power requirements. The light beam is optically modified, typically by a lens, to form a beam spot of a certain size at a prescribed distance. The optical scanner further includes a scanning component and a photodetector. The scanning component may either sweep the beam spot across the symbol and trace a scan line across and past the symbol, or scan the field of view of the scanner, or do both. The photodetector has a field of view which extends across and slightly past the symbol and functions to detect light reflected from the symbol. The symbol electrical signal from the photodetector is converted into a pulse width modulated digital signal, then into a binary representation of the data encoded in the symbol, and then to the alphanumeric characters so represented, as discussed above.

Many known scanning systems collimate or focus the laser beam using a lens system to create a beam spot of a given diameter at a prescribed distance. The intensity of the laser beam at this point, in a plane normal to the beam (i.e., parallel to the symbol), is ordinarily characterized by a "Gaussian" distribution with a high central peak. The working range is defined as the region within which the intensely bright beam spot can decode the code after being scanned across the bar code symbol. But as the distance between the scanner and the symbol moves out of the working range of the scanner, which is typically only a few inches in length, the Gaussian distribution of the beam spot greatly widens, preventing accurate reading of a bar code. Present scanning systems, accordingly, must be positioned within a relatively narrow range of distances from a symbol in order to properly read the symbol.

U.S. Pat. No. 5,080,456 to Katz et al. proposed a bar code reader using a laser beam scanning system which has a greatly extended working range or depth of focus. In general, the scanning system included a laser source, an optical means for generating a diffraction pattern with an extended central beam spot of a prescribed diameter, and a scanning means for scanning the modified laser beam across a symbol. In the preferred embodiment, the laser source produced a regular "Gaussian type" optical beam which was modified by an optical element, such as an axicon. This optical element produces a beam which diffracts much less in the direction parallel to the bar code pattern. Specifically, an axicon will bend light from a point source on the optical axis so as to cross the axis along a continuous line of points along a substantial portion of the axis. The intensity and diameter of the beam spot created thereby will vary significantly along the distance of this line. An axicon also produces diffraction rings of light concentric with the central spot. A slit may be placed in the light path parallel to the scan line and perpendicular to the bars and spaces of the bar code symbol to be scanned. The slit removes the portions of diffraction which are perpendicular to the direction of scan, e.g., parallel to bars and spaces of the symbol. The slit, however, did not remove portions of the rings which were located in areas parallel to the scan or perpendicular to the bars and spaces. Although the Katz et al. system provided improvements over conventional lenses previously used in bar code scanners, further refinement of axicon design is necessary to optimize performance for bar code scanning applications. For example, Katz et al. did not consider how many diffraction rings should remain in the diffraction pattern for optimum detection within a maximal working range.

Additional problems relate to positioning the laser and lens within the scanner so as to set and maintain the desired beam focusing. One approach has been to incorporate the laser source and lens into a module dimensioned to produce the requisite beam focusing. A laser diode and focusing module of this type will typically include a laser diode, at least one lens element for focusing light from the diode and means to fix the lens element at a desired distance from the laser diode so as to focus light from the diode at a point a predetermined distance in front of the module. Krichever et al., for example in their U.S. Pat. No. 4,923,281, teach telescoping two holding members of an emitting and focusing module against the force of a biasing spring positioned between the laser diode and the lens assembly to adjust the focusing of the light emitted by the module. One holding member is attached to the laser diode, and the other member holds the lens assembly for focusing the light from the laser diode. The second holder also provides an ellipsoidal aperture for the light passing through the lens. During actual focusing, the focusing module assembly is held in a jig which includes key or chuck elements to engage notches or keyways defining the orientation of the laser beam, lens and aperture as the two holding members are gradually telescoped together. As soon as the desired focus is achieved, the two holders are permanently fixed relative to one another by using adhesives such as glue or epoxy, or by fastening such as by staking, spot-welding, ultrasonic welding, or the like. Such focusing tends to require considerable labor by a skilled technician.

The focusing necessary for different scanning applications varies; a different focusing produces a different beam spot at different distances from the module. This produces a different working range and sensitivity for the scanner which must be chosen to correspond to the symbol density which the scanner will be expected to read and/or the preferred working range at which the scanner will be positioned. If a manufacturer produces scanners having a variety of working ranges and a variety of spot size sensitivities, the manufacturer must maintain an inventory of the above discussed laser diode and focusing modules preset to the focus appropriate for the particular scanner application the manufacturer expects each scanner product to service. Such an inventory is expensive to produce, particularly because of the labor intensive procedure for focusing each module.

DISCLOSURE OF THE INVENTION

Objectives

One objective of the present invention is formation of beams with extended focal depth that can be used for scanning purposes, e.g. for scanning bar codes.

Another objective of the invention is to provide means for extending the working distances and the range of bar code densities that can be decoded, with a performance superior to that which is achievable via lens-based scanners.

A more specific objective is to establish design rules for scanners using axicons or the like which will produce optimum performance for scanning of bar codes.

Another objective of the present invention is to produce a light emitter and associated optics package which can be easily adapted to a wide range of scanning applications, e.g. working ranges and/or information densities.

Summary

In one aspect, the present invention is a scanner wherein the optical components have been chosen to optimize performance in scanning optically encoded information of varying light reflectivity. This scanner includes a light source for directing a collimated beam of light in a path toward information to be scanned, and means for causing the beam of light to move along a scan line. In preferred embodiments, the light source is a laser, and an oscillating mirror produces the scanning movement. Optical means, provided in the path, create a spot of light defined by the beam having a size related to the size of features of the information to be scanned. Also, the beam of light exhibits this spot size over a substantial distance along an axis of the beam. A light detector receives light reflected from the scanned information to produce a signal representing variations in reflectivity of the information for subsequent decoding and processing.

In this first aspect of the invention, the optical means includes an optical element having a substantially flat surface, perpendicular to the axis of the optical means, and a second surface defined by a figure of rotation at an angle with respect to the first surface revolved about the axis of the optical means. An optical element of this type causes a phase tilt of the collimated beam of light inward toward the axis of the optical means. Preferred embodiments of the invention use a linear axicon as this optical element (where the figure of rotation is a line). The optical means also includes means for forming an aperture. The aperture limits the size and/or shape of the collimated beam of light which passes through the optical element. The limited extent of the collimated light beam passing through the optical element establishes a predetermined working range of the scanner for an optical element designed to produce a particular phase tilt. Preferred embodiments use circular apertures which limit the radius of light passing through the optical element; however, other aperture shapes, such as elliptical, can be used.

The invention also provides a series of specific design rules for selecting optimum parameters for the optical element and the dimensions of the aperture. For example, the value of the ratio $R_o\beta/\lambda$ should be less than 3 and preferably greater than 1. The value $\beta$ in this ratio is the phase tilt produced by the optical element, $R_o$ is the radius of the collimated beam of light passing through the optical element as limited by the aperture, and $\lambda$ is the wavelength of the light beam produced by the light source.

In another aspect, the present invention contemplates a method of scanning a symbol. This method includes the steps of generating a collimated light beam, moving the light beam to generate a scan line across the symbol to be read, and modifying the light beam in the path toward the symbol. Specifically, the modification creates a spot of light of a size correlated generally with the size of features of the symbol which maintains a substantially constant size for varying distances from the symbol, over a substantial range of the distances along the optical axis. This characteristic is a result of the phase tilt introduced in passing the beam through an axicon element and a limiting aperture. The resulting beam has an intensity distribution characterized by a central lobe surrounded by rings, such as described by a Bessel function distribution. The passage through the aperture also limits the number of rings which surround the central lobe of the scanning beam of light.

In preferred embodiments of this method, the step of producing a phase tilt is obtained by directing a collimated light beam through a solid optical element. The optical element again has a substantially flat first surface and a second surface defined by a figure of rotation revolved about the optical axis. This figure of rotation forms an angle with respect to the first surface. The figure of rotation is chosen to provide an aspherical optical element which produces the necessary spot of light exhibiting a substantially constant size for varying distances from the symbol. If the figure of rotation were quadratic (circular, parabolic), the resultant object would be a lens, which would not produce the substantially constant spot size for varying distances from the symbol. The figure of rotation can be a line, in which case the resulting optical element is a linear axicon. The figure of rotation can also fall in a range between a line and a quadratic figure. The aspherical optical elements used in the present invention do produce a beam spot which contains Bessel rings.

A second method in accord with the present invention includes the steps of generating a substantially monochromatic beam of collimated light and modifying the beam of light to create a beam spot of substantially constant diameter which extends along a predetermined distance along the path of the beam. Also, the beam spot exhibits a predetermined diffraction pattern having a central lobe and a plurality of rings surrounding the central lobe. Such a diffraction pattern might correspond to a Bessel function, as described above. This method further includes the step of limiting the extent of the beam diffraction pattern to reduce the number of the rings surrounding the central lobe. The limited beam is directed onto a symbol to be read and moved across the symbol.

In preferred embodiments of this second method, the step of modifying the beam of light comprises passing the beam of light through an optical element which produces a phase tilt of the collimated beam of light inward toward an axis of the optical element. Also, the step of limiting the extent of the beam diffraction pattern comprises limiting the radius of the collimated beam of light passing through the optical element, for example by passing the beam through a circular aperture to limit the beam to a predetermined radius.

In another aspect, the invention provides a modular light emitting device for use in a system for reading optically encoded information, comprising a universal light emitting module and an optical assembly mounted on the module to adapt the optical characteristics of light from the module to conform to the requirements of a particular scanning application. The universal module does not require specific focal length adjustment. As a result, such modules can be produced and kept in stock in large quantities at a low cost because of the elimination of a manual focusing adjustment during the manufacturing process. Optical elements and apertures can be matched as needed to specific applications and mounted on the universal module. If the mounting arrangement allows easy removal, the manufacturer can remove and replace the optical element and aperture to retrofit the modular device for a different scanning application.

More specifically, the light emitting module has a fore end portion from which light is emitted. The light emitting module includes a light emitting element such as a laser which emits light in a direction toward the fore end portion of the light emitting module. A first optical element collimates and focuses the light from the first light emitting element substantially to infinity. First mounting means position the first optical element along an axis of light emitted from the light emitting element at a point adjacent the fore end portion of the light emitting module. An optical assembly will be mounted over the fore end portion of the light emitting module from which light is emitted. The assembly includes a second optical element that will bend the collimated light from the first optical element so as to cross the axis along a continuous line of points along a substantial extent of the axis. In the preferred embodiments, the second optical element is a linear axicon. An aperture limits the extent of the beam of light passing through the second optical element.

The second optical element is shaped and the aperture is dimensioned so that together the second optical element and the aperture create a spot of light of a size correlated generally with dimensions of features of the information to be scanned. These dimensions also maintain the spot at a substantially constant size for varying distances between the device and the symbol over a substantial range of the distances on the optical axis.

In another aspect, the invention consists of an optical scanner incorporating the above discussed modular light emitting device.

In the preferred embodiments of the modular light emitting device, the optical element is a solid optical element having a substantially flat surface and a second surface defined by a figure of rotation revolved about an axis perpendicular to the first surface. The figure of rotation forms an angle with respect to the light receiving surface. A linear axicon is a typical example of such a solid optical element. Optical elements of this type produce a diffraction pattern comprising a central lobe and a number of rings surrounding the central lobe. The aperture limits the number of rings in the pattern which actually reach the symbol during scanning. The aperture can be placed between the first and second optical elements. Alternatively, the second optical element can be between the first optical element and the aperture with the aperture positioned adjacent to a surface of the second optical element from which light emerges.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIGS. 9-12 are tables showing actual working ranges obtained in computer simulations of scanners implementing the present invention. Of these drawings, FIG. 11 also shows experimental results.

BEST MODE FOR CARRYING OUT THE INVENTION

Figure 1:
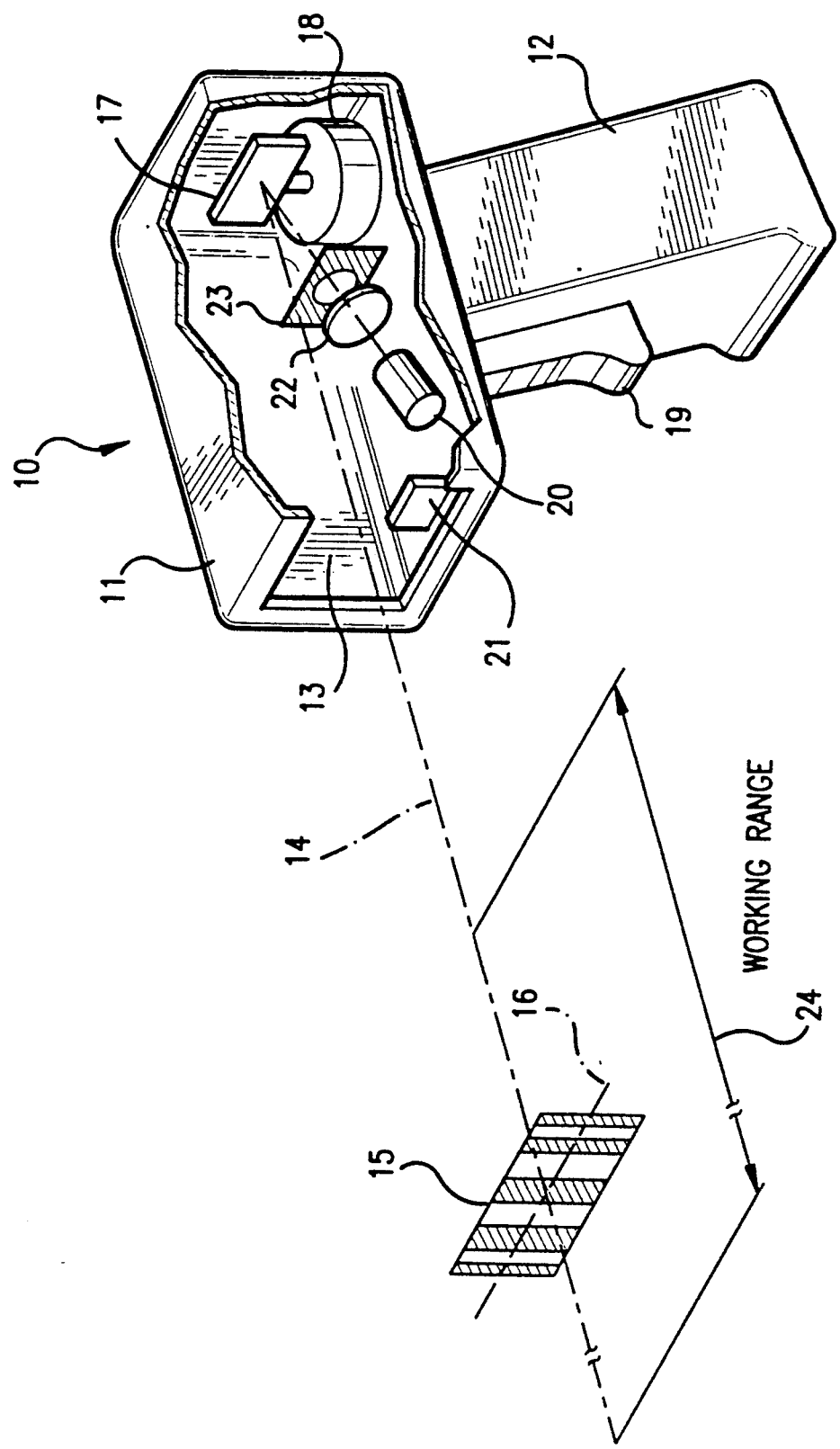
FIG. 1 is a partially sectioned isometric view of a hand-held optical scanner, in accord with the present invention, shown in position for scanning a bar code symbol.

As used in this specification and in the appended claims, the term "symbol" broadly encompasses not only symbol patterns composed of alternating bars and spaces of various widths as commonly referred to as bar code symbols, but also other one or two dimensional graphic patterns, as well as alphanumeric characters. In general, the term "symbol" may apply to any type of pattern or indicia which may be recognized or identified by scanning a light beam and detecting reflected or scattered light as a representation of variations in light reflectivity at various points of the pattern or indicia. FIG. 1 shows a bar code 15 as one example of a "symbol" which the present invention can scan.

FIG. 1 depicts a hand-held laser scanner device 10 for reading symbols. The laser scanner device 10 includes a housing that is generally of the type shown in the above-mentioned patents having a barrel portion 11 and a handle 12. Although the drawing depicts a hand-held pistol-shaped housing, the invention may also be implemented in other types of scanner housing, such as a desk-top workstation or stationary scanner. In the illustrated embodiment, the barrel portion 11 of the housing includes an exit port or window 13 through which an outgoing laser light beam 14 passes to impinge on and scan across the bar code symbol 15 located at some distance from the housing.

The laser beam 14 moves across the symbol 15 to create a scan pattern. Typically, the scanning pattern is one dimensional or linear, as shown by line 16. This linear scanning movement of the laser beam 14 is generated by an oscillating mirror 17 driven by a stepping motor 18. If desired, means may be provided to scan the beam 14 through a two dimensional scanning pattern, to permit reading of two dimensional optically encoded symbols. Also, instead of the oscillating mirror, means may be provided to move the laser source 20 and/or the axicon 22 to produce the desired beam scanning pattern.

A manually actuated trigger 19 or similar means permit the operator to initiate the scanning operation when the operator aims the device 10 at the symbol 15. Use of the trigger switch reduces the power drain since the components, such as the laser light source, the scan motor 18, and the photodetector and decoder, can be activated during limited periods of actual scanning of a symbol rather than at all times.

The scanner device 10 includes a laser source 20, e.g., a gas laser tube or a semiconductor laser diode, mounted within the housing. The laser source 20 generates the laser beam 14. A photodetector 21 is positioned within the housing to receive at least a portion of the light reflected from the bar code symbol 15. The photodetector 21 may face toward the window 13. Alternatively, a convex portion of the scan mirror 17 may focus reflected light on the photodetector 21, in which case the photodetector faces toward the scan mirror. As the beam 14 sweeps the symbol 15, the photodetector 21 detects the light reflected from the symbol 15 and creates an analog electrical signal proportional to the reflected light. A digitizer (not shown) typically converts the analog signal into a pulse width modulated digital signal, with the pulse widths and/or spacings corresponding to the physical widths of the bars and spaces of the scanned symbol 15. A decoder (not shown), typically comprising a programmed microprocessor with associated RAM and ROM, decodes the pulse width modulated digital signal according to the specific symbology to derive a binary representation of the data encoded in the symbol, and the alphanumeric characters represented by the symbol.

The laser source 20 directs the laser beam through an optical means comprising the axicon 22 and the aperture 23, to modify and direct the laser beam onto the rotary mirror 17. The mirror 17, mounted on a vertical shaft and rotated by the motor drive 18 about a vertical axis, reflects the beam and directs it through the exit port 13 to the symbol 15. The illustrated aperture 23 is elliptical, although other aperture shapes can be used. The aperture limits the extent of the beam passing through the axicon and reduces the number of rings present in the resultant diffraction pattern, as will be discussed in detail below.

To operate the scanner device 10, the operator depresses trigger 19 which activates the laser source 20 and stepper motor 18, etc. The laser source 20 generates a laser beam which passes through the axicon 22 and aperture 23 combination. The axicon 22 and aperture 23 modify the beam to create an intense beam spot of a given diameter which extends continuously and does not vary substantially over a distance 24 (as described in detail in U.S. Pat. No. 5,080,456 to Katz et al. incorporated herein by reference). The axicon and aperture combination directs the beam onto the rotary mirror 17, which directs the modified laser beam outwardly from the scanner housing 11 and toward the bar code symbol 15 in a sweeping pattern, i.e., along scan line 16. A bar code symbol 15, placed at any point within the distance 24 and substantially normal to the laser beam 14, reflects a portion of the laser light. The photodetector 21, mounted in the scanner housing 11, detects the reflected light and converts the received light entry into an analog electrical signal. The system circuitry then converts the analog signal to a pulse width modulated digital signal which the microprocessor based decoder decodes according to the characteristics of the bar code symbology rules.

An axicon is a figure of revolution that by reflection, refraction or both will bend light from a point source on the axis of the figure of revolution so as to cross the axis along a continuous line of points along a substantial extent of the axis. Thus an axicon does not focus the light at a single point or a narrow region along the axis, as would be the case with a lens. An axicon illuminated by a collimated beam produces a wave front tilt of such a beam inward toward the axis of the axicon. The resulting beam contains diffraction rings of light concentric with the central spot. The aperture 23, placed in the light path, limits the number of such diffraction rings. The aperture 23 eliminates both portions of these rings in areas thereof which are parallel to the direction of scanning and portions of the diffraction rings in areas thereof which are perpendicular to the direction of scanning.

Where the axicon is a separate optical element as shown in the drawings, the axicon has a first surface which is substantially flat. A second surface of the axicon has a shape defined by a figure of rotation, at an angle with respect to the first surface, which is revolved about the central axis of the axicon. In the preferred embodiment using a linear axicon, the figure of rotation is a line, and therefore the second surface is conical. The linear axicon can be oriented to receive light through its conical surface and emit light from the flat surface. Alternatively, the axicon can receive incident light through the flat surface and emit light through its conical surface, as shown more clearly in FIGS. 3 and 5. The optical element can have alternate shapes and/or can be replaced with a reflective element, so long as the element produces the phase tilt and diffraction pattern discussed in more detail below.

Figure 2A:
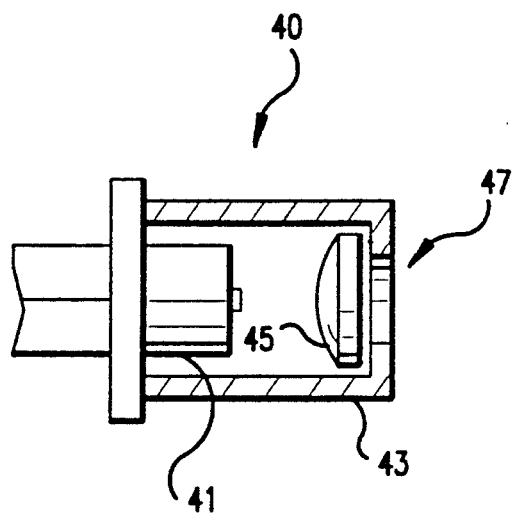
FIG. 2A is a sectional view of a laser emitter and optics module.
Figure 2B:
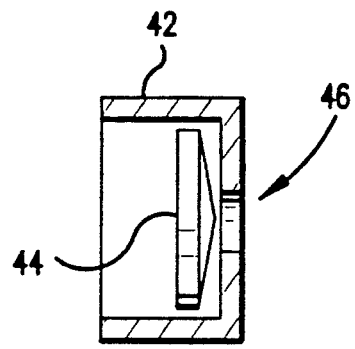
FIG. 2B is a sectional view of an aperture and axicon assembly.
Figure 3:
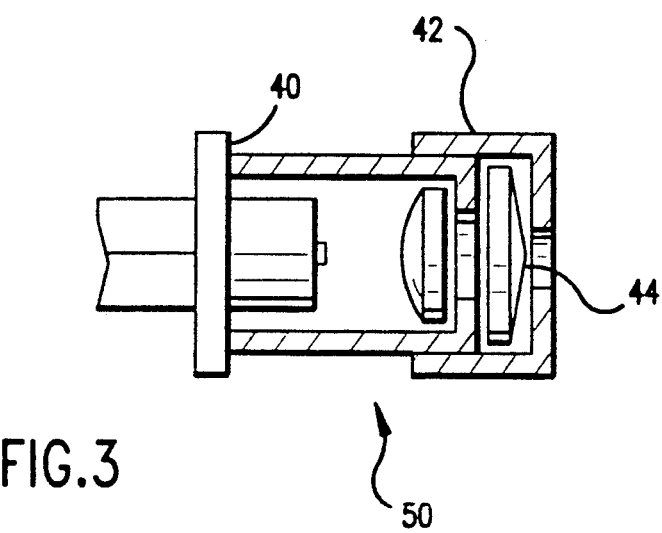
FIG. 3 is a sectional view of an emitter and focusing module formed by the combination of the emitter and optics module of FIG. 2A with the aperture and axicon assembly of FIG. 2B.

FIGS. 2A, 2B and 3 show a laser emitter and focusing module which may replace the laser source 20 and axicon 22 in the laser scanner device 10 of FIG. 1. FIG. 2A shows a "universal" laser and optics module 40. The universal module 40 includes a small-sized laser diode 41, a holder 43 and a focusing lens 45. Laser diode module 41 may be of a type which emits a beam of light in the visible portion of the spectrum. Electrical connection leads extend from the rear surface of the base of the laser diode 41. The cylindrical fore end portion of the laser diode 41 is seated within the rear section of the holder 43, which typically is formed of brass. The brass of the laser holder will serve as a heat sink to dissipate heat generated by the laser diode 41. The holder 43 may be sized to press fit over the cylindrical fore end portion of the laser diode 41, or the holder 43 can be bonded to the fore end portion and/or the base of the laser diode 41, for example by welding or gluing.

The fore end of the holder 43 serves as a seat for the lens 45. The lens may be held in place by a number of means. For example the lens 45 may be glued to the holder 43 or retained in place by some form of snap ring. Alternatively, the universal module 40 may include a spring compressed between the laser diode 41 and the lens 45. The expansion force provided by such a spring would press the lens 45 against the front lip formed on the fore end portion of the holder 43. The holder 43 positions focusing lens 45 at a distance from the light emitting front surface of the laser diode 41 along the axis of the beam of light emitted from the laser diode 41. The front lip formed on the fore end portion of the holder 43 provides a large opening 47, through which the module 40 emits the beam of light.

The universal module 40 can take a number of different forms. For example, instead of the holder 43 illustrated in FIG. 2A, the module could use a housing structure similar to that disclosed in U.S. Pat. No. 4,923,281 to Krichever et al.

The module 40 serves as a "universal module" because the lens 45 and opening 47 are chosen and positioned so as to focus the beam from the laser diode 41 to infinity. To adapt such a unit to provide a desired beam spot size at a desired distance in front of the module and to produce a desired scanner working range, an axicon and aperture dimensioned to refocus the beam as necessary, will be mounted on the fore end of the holder 43. FIG. 2B illustrates a preferred embodiment of the axicon and aperture cap arrangement.

The cap 42 encloses an axicon element 44. The front lip of the cap 42 also forms a circular aperture 46, smaller than the opening 47. FIG. 3 shows a completed laser emitter and focusing module 50 which includes the universal module 40, the cap 42 and the axicon 44. As shown, the cap 42 is sized to press fit over the fore end portion of the universal module 40. With such a mounting configuration, the cap 42 can be removed and replaced with another assembly having a different aperture size and/or axicon angle, to provide a module of different spot size and working range. Alternately, the cap 42 can be bonded to the fore end portion of the holder 43, for example by welding or gluing. Also, the structure shown for the cap 42 is exemplary in character. The cap 42 can take a wide variety of alternate forms. Of particular note, cap 42 could be redesigned to place the aperture 46 between the rear surface of axicon 44 and the front surface of the universal module.

The aperture 46 limits the radius of the beam of light emitted by the module 50. The aperture 46 together with the angle of the conical front surface of the linear axicon element 44 defines the non-spreading cross section distribution of the resulting light beam. Design rules for choosing the proper aperture radius and axicon angle for a given scanning application will be discussed below, with regard to FIG. 5. Because the aperture and axicon are formed as elements of a separate unit (FIG. 2B), the beam radius and axicon angle can be chosen to produce a desired beam spot size and non-spreading distribution range to correspond to each expected application (bar code density, working range, etc.). The focusing of the universal module need not change between different applications. The manufacturer would simply use a different cap and axicon assembly for each scanning application.

Figure 4B:
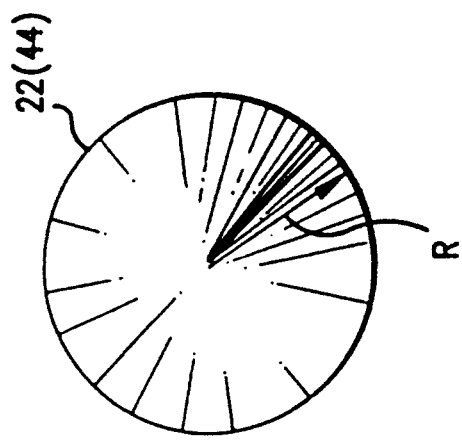
FIGS. 4A and 4B are sectional and plan views respectively, of a linear axicon type refractive optical element for use in the present invention.
Figure 4A:
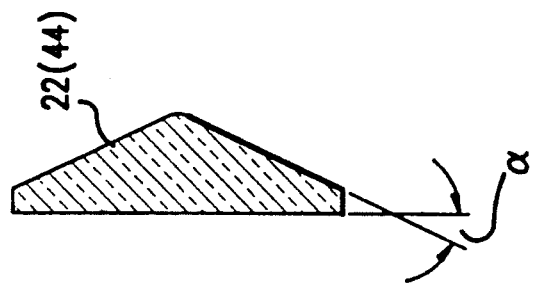
Figure 5:
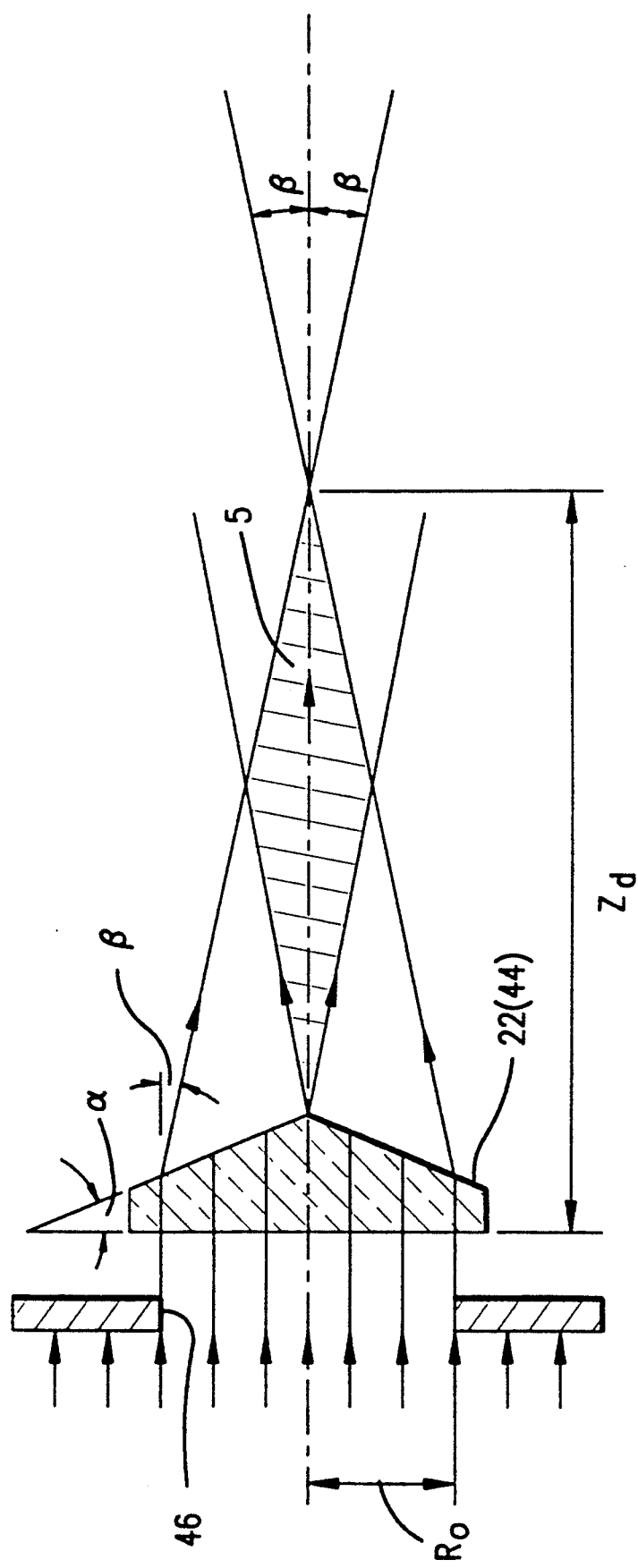
FIG. 5 is a schematic representation of the light distribution produced by a collimated light beam passing through a linear axicon and a circular limiting aperture.

FIGS. 4A and 4B depict a linear axicon type optical element, in sectional and front views, respectively. The axicon shown in these drawings corresponds to the axicon 22 in the embodiment of FIG. 1 and the axicon 44 in the modular embodiment of FIG. 3. As shown in FIGS. 4A and 4B, the axicon 22 (44) is a circular element having a radius of R. A first surface is substantially flat. The second surface is defined by a line rotated about the central axis of the axicon. The line forms an angle $\alpha$ with respect to the flat surface shown on the rear of the axicon. FIG. 5 illustrates the light distribution produced by a collimated light beam passing through an aperture 46 and the linear axicon 22 or 44.

The optical element and aperture arrangement of the present invention produces light beams with extended focal depth that are particularly suited for optical scanning, e.g. for scanning bar codes. Axicons can be utilized in the formation of such beams, although other aspheric profiles varying with $\rho^K$ (K<2 where $\rho$ is a radial distance) can be used as well. It has now been found that the aperture (beam diameter) and the tilt angle determine the working region, and it is possible to select values for these parameters to optimize scanning performance.

The following mathematical analysis will treat linear axicons as a private class of aspheric elements, but the results do not vary substantially for aspheric profiles which differ very little from the linear shape provided by axicons. It has been recognized that axicons are structures that generate a beam which along significant distances remains tight, with limited spreading around the propagation axis. It is useful to use an approximate geometric approach to identify the bounds of this active region, as shown in FIG. 5.

Katz et al., in U.S. Pat. No. 5,080,456, disclosed the following relationship of the geometrical active region (depth of field) to a radius R which was the radius of the axicon element:

$$Z_d = \frac{R}{(n-1)\alpha}$$

where n is the index of refraction of the axicon and $\alpha$ is the tilt angle of the conical surface of the axicon. Katz et al., however, did not specifically suggest limiting the radius beam of the collimated beam passing through the axicon, by provision of an aperture, to adjust the working range. It has now been found that provision of an aperture of appropriate size, together with selection of the axicon angle, can establish a desired depth of field and corresponding working range for an optical scanner. The specific geometry and the corresponding mathematical analysis to establish optimum scanner performance for given symbol densities will be discussed in detail below. To simplify the analysis, we will assume that the aperture 46 is circular and limits the effective radius of the collimated beam as it passes through the optical element; however, similar principles apply for apertures of different shapes. Also, although FIG. 5 shows the axicon receiving light through its flat surface and emitting light through its conical surface, the following analysis applies if the orientation of the axicon is reversed, i.e., the incoming light impinges on the conical surface and light emerges through the flat surface.

The depth of field for the aperture and axicon arrangement of FIG. 5 can be expressed as follows:

$$Z_d = \frac{R_o}{(n-1)\alpha} = \frac{R_o}{\beta} \quad (1)$$

where $$\beta = (n-1)\alpha \quad (1.1)$$

where n is the index of refraction of the axicon, $\alpha$ is the tilt angle of the conical surface of the axicon, and $\beta$ the resulting phase tilt. This formulation, however, uses the radius $R_o$ of the collimated beam which actually passes through the axicon. In the present invention, the beam radius $R_o$ is limited by some means such as aperture 46. In such an arrangement, the beam radius $R_o$ corresponds to the radius of the aperture.

The aperture 46 limits the effective radius of the light passing through the axicon whether the aperture is between the laser source and the axicon, as in FIG. 5, or the aperture is adjacent to the inclined front surface of the axicon as in FIG. 3. If the aperture is between the laser source and the axicon, the aperture limits the radius of the beam actually applied to illuminate the flat rear surface of the axicon. If the aperture is adjacent to the inclined front surface of the axicon, the aperture limits the radius of the light emerging from the axicon. The geometry of the resulting beam, however, is approximately the same for either position of the aperture.

It can be shown that within the hatched area illustrated in FIG. 5, the beam reaches a minimum spread at $$\bar{z} = \frac{2z_d}{3} \quad (2)$$

The spot size is determined by the beam inclination, which is defined by the phase shift introduced by the device. Since the diameter of the central spot is, as indicated in the U.S. Pat. No. 5,080,456

$$d = \frac{2.4\lambda}{\pi\beta} \quad (\beta << 1) \quad (3)$$

where $\lambda$ is the wavelength of the beam of light emitted by the laser source, and since the bar/space width "m" could be no smaller than d/2 in order that contrast levels be still reasonable (i.e. >15%) the result is $$m = \frac{2.4\lambda}{2\pi\beta} \simeq 0.38 \frac{\lambda}{\beta} \quad (4)$$

or

-continued $$\beta = \frac{2.4\lambda}{2\pi m} \approx 0.38 \frac{\lambda}{m}$$

Using spatial frequency nomenclature, since $f_x \frac{1}{2} m$, the result becomes $$f_x = \frac{\pi \beta}{2.4\lambda} \qquad (5)$$

Using formula (1.1) to define the tilt angle $\beta$ in terms of the axicon angle, formulae (4) and (5) become $$m = \frac{2.4\lambda}{2\pi(n-1)\alpha} \approx 0.38 \frac{\lambda}{(n-1)\alpha} \qquad (4.1)$$

and $$f_x = \frac{\pi(n-1)\alpha}{2.4\lambda} \qquad (5.1)$$

Figure 6:
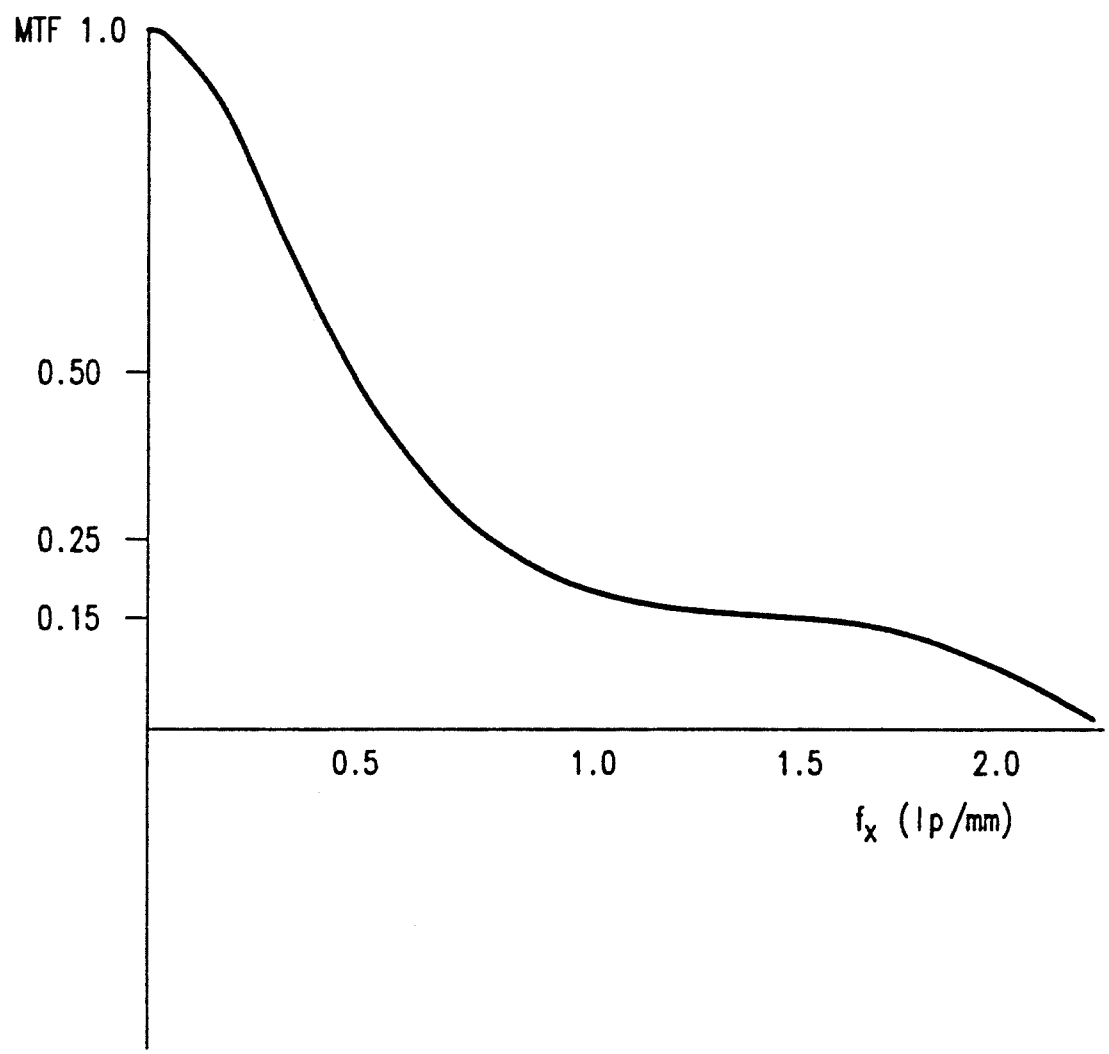
FIG. 6 is a graph of the modulation transfer function with respect to the spatial frequency of scanned symbols for a scanner using an axicon.

Detection of bar codes relies on collecting light reflected from a number of bars and spaces. As such, the important feature is the "line spread function," contrary to the point spread function used when scanning arbitrary targets. The line spread function of Bessel-like beams (as provided by axicons or similar aspheric elements) generates a modulation transfer function (MTF) which exhibits low values over a large range of spatial frequencies (bar code densities), as shown for instance in FIG. 6. Specifically, FIG. 6 illustrates the MTF resulting from use of an axicon which produces a phase front tilt of $\beta$ of 0.625 mRad. The MTF of the line spread function was measured at a distance $Z = 1.4$ m. This measurement was taken using a uniform input illumination radius of $R_o = 2$ mm, and the laser source provided an input light beam of wavelength $\lambda = 670$ nm. The electronic circuits should be designed in such a way that low contrast signals could be handled. This will enable extension of the operation over the entire range where the modulation transfer function MTF exceeds a certain low value, say 15% (0.15 in FIG. 6). The graph of FIG. 6 illustrates the extended range of code densities that the scanner of the present invention can be effectively read.

The equivalent formulae (4) and (5) show that the bar/space width and light wavelength determine the necessary axicon that will generate a certain phase front tilt ($\beta$). Also, formulae (1) and (2) show that the radius of the illuminating beam (or the aperture defining it) will determine both the working range and the position of the beam's narrowest location (at $2z_d/3$).

Figure 7A:
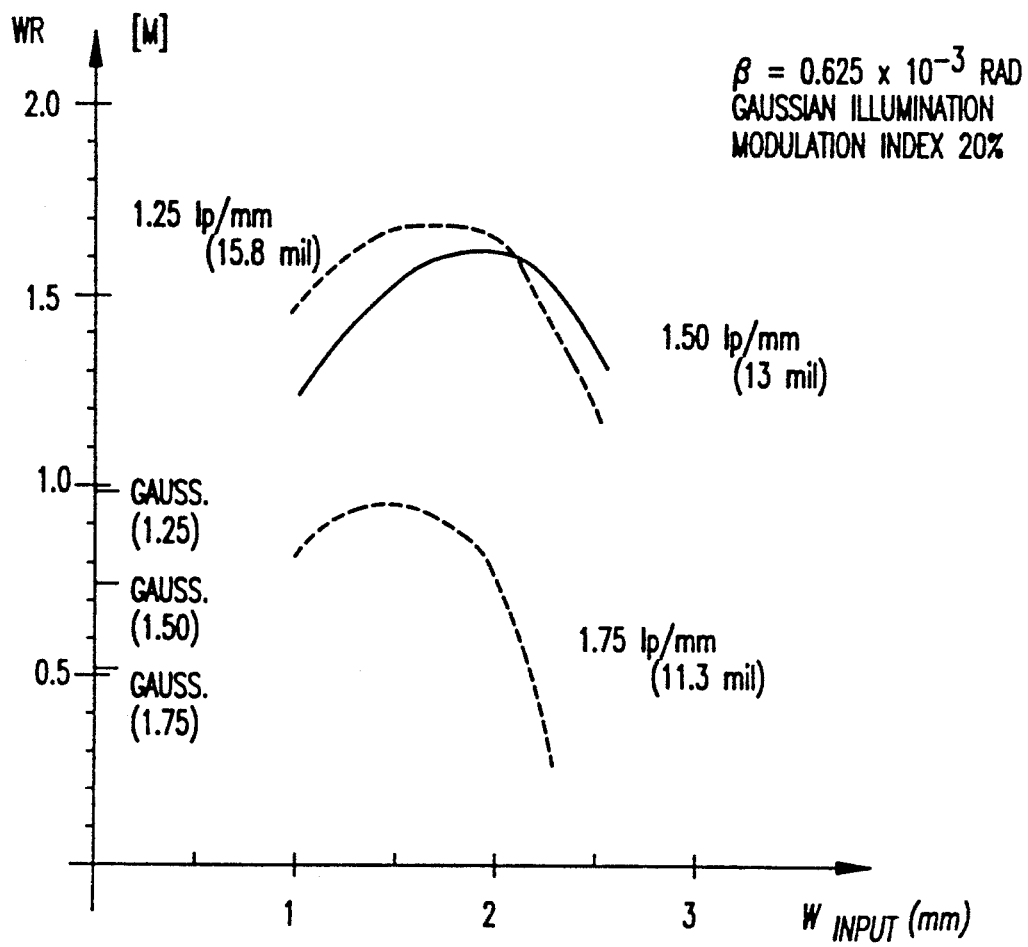
FIGS. 7 and 8 are graphs showing the working range as a function of the illumination width for different spatial frequencies of codes scanned using the present invention.
Figure 7B:
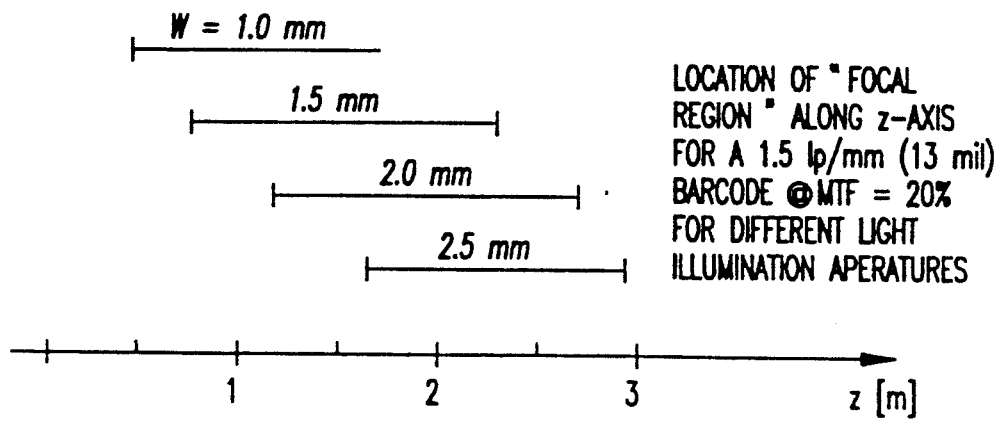
Figure 8A:
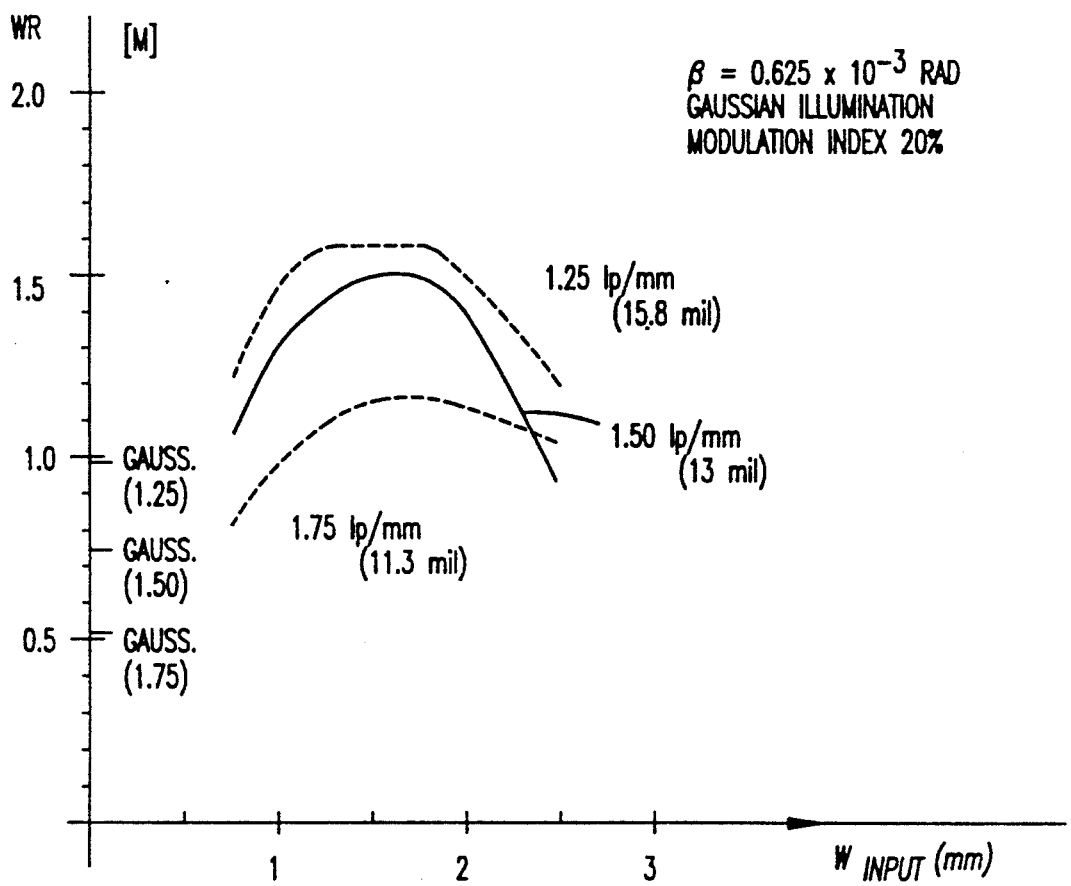
Figure 8B:
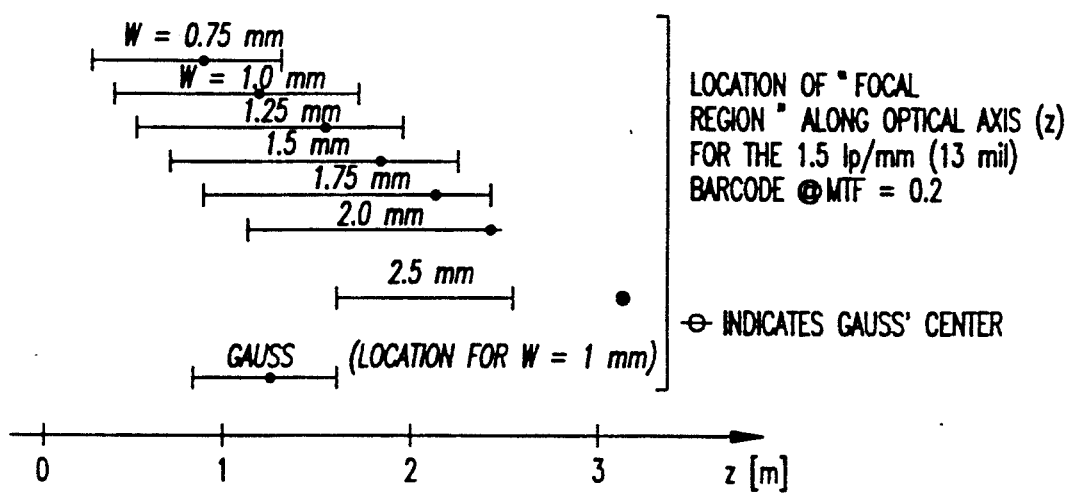

If Gaussian beams are used to illuminate the axicon, the input beam waist ($1/e^2$ intensity points) acts as the beam size. Some typical curves, showing the working range (WR) as a function of the illumination waist (w) for different spatial frequency patterns (i.e., bar codes), are shown in the upper portions of FIGS. 7 and 8. The line graphs in the lower portion of each of these drawings illustrate the location of different working ranges along the optical axis for reading a 13 mil bar code using different values for the waist of the Gaussian illuminating beam, corresponding to different aperture sizes.

Although the above discussed derivations apply for axicons, for which some analytical expressions can be derived, they hold also in broad terms for aspherical surfaces with optical characteristics that differ somewhat from the linear phase shift provided by axicons, and for which close form solutions are not presently available. For example, where the optical element for producing the phase tilt is in close proximity or attached to another optical element, the light receiving surface might conform to the shape of the light emitting surface of the other element. If the other element is a lens, the light receiving surface would have a shape corresponding to the shape of the lens. The second surface of the optical element for producing the phase tilt would then have an aspherical contour chosen such that the difference between the two surfaces of that element would correspond to the difference between the surfaces of the linear axicon discussed above.

Axicons have been shown to provide "extended distances" with constant beam spread. The axicon conical angle and the optical aperture uniquely define the working range, the dead zone and the beam capability to detect bar codes of given density. It has now been found that an optimum configuration for scanning purposes exhibits a value for the expression $R_o\beta/\lambda$ which is between the values of 1 and 3. This requirement essentially establishes that the number of permissible rings in the diffraction pattern should be limited so that the point spread function is acceptable for scanning purposes. A number of theoretical estimates, computer simulations and experimental results which show that optimum scanning performance is achieved for this value will be discussed in detail below. One should note that since $\beta$ is chosen based on the desired point spread function (which is narrower—thus larger $\beta$—for high density bar codes, and wider—thus smaller $\beta$—for lower density ones), one does not have independent control of the dead zone, given approximately by 0.3 $R/\beta$. However, one can find the range of values which provide acceptable performance of all parameters, for instance $\beta = 0.002$ Rad and $R = 1$ (FIG. 10) provide values which are very adequate.

Axicons are the simplest means for generating "diffraction-free" beams, in view of their ability to transform an incoming planar wave front into a conical one, which generates a Bessel function transverse distribution, in some region behind the location of the device. A set of unlimited plane waves that have their propagating k-vector along a conical surface do indeed generate a Bessel $J_o$ distribution:

$$J_o(k\rho\sin\beta) \qquad (6)$$

with $k = 2\pi/\lambda$, where $\lambda$ is the wavelength and $\rho$ is radial distance.

An axicon is a truncated version of such a conical optical surface, and as such provides an "imperfect" Bessel distribution. Nevertheless, this feature is beneficial since it limits the number of sidelobes, which is a desired feature for scanners. Axicons do have the potential to deliver an extended focused beam in a region $Z_d$, as indicated in FIG. 5, whereby $$Z_d = \frac{R_o}{\beta} \qquad (1)$$

where $R_o$ is the radius of the illuminating beam and $\beta$ the inclination of the k vector with respect to the longitudinal (z) direction, as discussed above.

Moreover, it was shown by formula (4) that there is a direct relationship between $\beta$ and the spatial frequency response of the axicon-generated beam, given approximately by $$\beta \approx 0.38 \frac{\lambda}{m} \qquad (7)$$

where m is the width of the narrowest element of the bar code.

The axicon-generated beam has its highest concentration, i.e. "best spot," at a distance of $2Z_d/3$. The above formulations therefore indicate that there is a free parameter, $R_o$, through which one can shift the best spot to any position. As a rule of thumb, the working range for bar code decoding extends between $Z_d/3 \pm Z_d/4$, and $Z_d$ can be extended (or reduced) by increasing (or reducing) $R_o$.

It is, however, very important to realize, as it will be shown below, that $R_o$ is not completely an independent parameter.

The oscillating nature of a Bessel distribution point spread function is quite unsuitable for scanning purposes, if too many Bessel rings are contained in the pattern. Indeed, the line spread function (LSF) obtained from linear integration of the Bessel point spread function shows a significant decrease of the modulation transfer function when the radius of the "Bessel diffraction free beam" is increased.

The number of Bessel rings accommodated in the geometrical "best spot," which has a radius of $R_o/3$ (see FIG. 5), will now be evaluated. It is known that the Bessel function (Eq. 6) has rings bounded by the nulls of the Bessel function.

Since $J_o(z) = 0$ for $z = 2.4, 5.6, 8.7 \ldots$ or approximately $z \approx 2.4 + \pi t = (0.76 + t)\pi$, we have from Eq. 6, that $$\frac{2\pi}{\lambda} \rho\beta = (0.76 + t)\pi$$

or $$\rho = (0.76 + t)\frac{\lambda}{2\beta} \qquad t = 0, 1, 2 \ldots$$

Thus, since $\rho$ is equal to $\frac{1}{3}$ of the illuminating radius at the narrowest point location:

$$\frac{R_o}{3} = (0.76 + t)\frac{\lambda}{2\beta} \qquad (8)$$

will provide an estimate for "t" the number of Bessel rings around the central lobe contained at the "best spot." Therefore, whenever the quantity M, defined as being equal to $R_o\beta/\pi$ is below 1.14 (=3/2·0.76) the "best spot" barely contains the central Bessel lobe region ($t \leq 0$). When M is 2.64 only one ring surrounds the best spot (t=1), for 4.14 two rings (t=2), etc.

Computer simulations for a number of tilt angles ($\beta = 0.625, 1, 2, 5$ mRad) and a number of radii (R=2,1,0.5,0.25) are summarized in the tables shown in FIGS. 9-12. From these simulations, a number of conclusions can be drawn, as will be discussed below.

The most important conclusion from the simulation results is that best results (largest working range) can be obtained if the factor M is smaller than 3. Consider the table of FIG. 10, as an example, which was derived for a modulation index, or contrast C, equal to 0.12. As shown in the lower portion of the table, the MTF for a 4 rail bar code and a 5 rail bar code is below the 0.12 value assumed necessary to produce an accurate reading of such codes, when the value of $M = R_o\beta/\lambda$ is 6 (first column of data). As a result, there is no working range at all for such bar code densities. Also for the M=6 case, the working ranges achieved for the lower density codes of 10, 15 and 20 mils are relatively short and far away from the axicon element. If the axicon and aperture are chosen to produce a value of $R_o\beta/\lambda$ or M of 3 or 1.5 (middle columns), the working ranges become much longer and the scanner can effectively read all sizes of the bar codes without the MTF value falling below the 0.12 cut-off. Also the working ranges occur at points closer to the axicon element, facilitating positioning of the scanner so that the scanned code is relatively close to the front of the device. Although the right column shows that when the value of M is 0.75, the scanner can read all of the code sizes listed, the working ranges achieved are actually smaller than for the situations where M was 3 or 1.5. The other tables shown in FIGS. 9, 11 and 12, show similar advantageous results when M is between 1 and 3.

Experimental results shown in FIG. 11 confirm the conclusions drawn from the computer simulations. The experimental results for a 1 mm aperture correspond to a value of M of 1.5. These results show long working ranges for all four bar code densities. Also, these working ranges all start at approximately the same distance, 14 or 15 inches. Use of a 0.5 mm aperture (M=0.75) produced working ranges closer to the axicon element; however, several of the working ranges, particularly the range for a 10 mil bar code, are shorter than the ranges produced using the 1 mm aperture in FIG. 11.

By substituting the value of $\beta$ from Eq. (7) into the expressions for WR and M, we now have the following:

$$WR \approx \frac{1}{2} Z_d = \frac{1}{2} \cdot \frac{R_o}{\beta} = \frac{1}{2} \cdot \frac{mR_o}{0.38\lambda} \qquad (9)$$

$$M = \frac{R_o\beta}{\lambda} = \frac{0.38 R_o}{m} \qquad (10)$$

and M as shown from computer simulations should be between 1 and 3, with the result that $$1 < \frac{R_o\beta}{\lambda} < 3 \qquad (10.1)$$

or $$1 < \frac{0.38 R_o}{m} < 3 \qquad (10.2)$$

Substituting $R_o$ from Eq. (10) into Eq. (9), one gets $$WR = \frac{1}{2} \cdot \frac{M}{(0.38)^2} \cdot \frac{m^2}{\lambda} = 3.5M \frac{m^2}{\lambda} = (3.5 \div 10.5) \frac{m^2}{\lambda} \qquad (11)$$

It is important to note that for a "Best Gaussian beam" one has $$W_o = \frac{\sqrt{\ln(1/C)}}{\pi f_o}$$

with a resulting working range $$WR = 2Z_r = 2\pi \frac{W_0^2}{\lambda} = \frac{-8m^2 \ln C}{\lambda \pi} = -2.54(\ln C) \frac{m^2}{\lambda} \quad (12)$$

where C is the contrast or "modulation index" of the detected pattern.

The improvement provided by the axicon structure in comparison to the "Best Gaussian" can be evaluated by dividing Eq. (11) by Eq. (12):

$$|Q| = \frac{3.5 M \pi}{8 \ln C} \quad (13)$$

which can now be evaluated for several values of M and C, as shown below:

| M | C | Q |
|---|-----|------|
| 1 | 0.3 | 1.14 |
|   | 0.2 | 0.85 |
|   | 0.1 | 0.59 |
| 2 | 0.3 | 2.28 |
|   | 0.2 | 1.71 |
|   | 0.1 | 1.19 |
| 3 | 0.3 | 3.42 |
|   | 0.2 | 2.56 |
|   | 0.1 | 1.79 |

The coefficient of $m^2/\lambda$ is (3.5÷10.5) for the axicon case and only about (5.4÷6.4) for the Gaussian case (assuming C=0.12 or 0.08), thus indicating that theoretically the axicon may increase the working range by a factor of 1.3÷1.65 (30–65%) for the nominal designed density, provided M=2÷3. It also indicates that if M<2, a Gaussian beam would be of comparable quality.

The actual working ranges obtained in the computer simulation are summarized in the tables shown in FIGS. 9–12.

Thus, if an illumination beam having a radius $R_o$, established by the radius of the aperture 46, impinges upon an axicon that provides a conical wave with phase front tilt of $\beta$ Rad, the resulting beam will maintain a non spreading cross section distribution over distances ranging approximately from $0.3-0.9$ $R_o/\beta$. However, for scanning purposes, wide cross-section beams are undesirable, and thus incident beams should satisfy the condition $$1 < \frac{R_o \beta}{\lambda} < 3 \quad (10.1)$$

The embodiment of FIG. 3 utilizes a number of interchangeable axicon and aperture cap units, each containing an axicon of tilt angle $\beta$ (defined by $(n-1)\alpha$) and an aperture of radius $R_o$, which could be utilized in conjunction with the collimated laser assemblies. The choice of $\beta$ and $R_o$ for each cap will depend on the intended application (bar code density, working range, etc.). Also, the assemblies 50 could be retrofitted (by replacing the axicon cap) if scanners will be used for different bar code density symbols.

The preferred embodiments discussed above use a refractive type axicon as the optical element, i.e. the beam of light passes through and is modified by the element to produce the requisite phase tilt. It is also possible to use a reflective type optical element of appropriate contour. For example, the optical element could take the form of a conically shaped mirror. Such a mirror would comprise a reflective surface defined by revolution of a line or similar figure of rotation about the central axis of the mirror.

Also, the aperture used in the present invention can have a variety of shapes. As shown in FIG. 1, the aperture 23 is elliptical, and the aperture 46 of FIGS. 2A to 5 was described as a circular aperture of a specified radius. The aperture could also be square, rectangular, etc. In each case, the aperture limits the extent of the collimated beam as modified by the optical element, thereby limiting the extent of the diffraction pattern and reducing the number of rings present in the diffraction pattern.

What is claimed is:

1. A scanner for scanning optically encoded information of varying light reflectivity, said scanner comprising:
   (a) a light source for directing a collimated beam of light in a path toward information to be scanned, and means for causing the beam of light to move along a scan line;
   (b) an optical element having a substantially flat first surface perpendicular to an axis of the collimated beam of light and a second surface defined by a figure of rotation revolved about said axis, said figure of rotation being at an angle with respect to said first surface, said optical element causing a phase tilt of the collimated beam of light inward toward said axis;
   (c) means for forming an aperture for limiting the extent of the collimated beam of light passing through the optical element, wherein the extent of the collimated light passing through said optical element establishes a predetermined working range of the scanner for a particular phase tilt caused by the optical element; and
   (d) a light detector positioned to receive light reflected from said information.

2. A scanner as in claim 1, wherein said light source is a laser.

3. A scanner as in claim 1, wherein the means for forming an aperture form a circular aperture or an elliptical aperture.

4. A scanner as in claim 1, wherein the phase tilt produced by the optical element relates to a minimum symbol width m of the information to be scanned as follows $$\beta = \frac{2.4\lambda}{2\pi m}$$

where $\beta$ is the phase tilt caused by the optical element and $\lambda$ is the wavelength of the beam emitted by the light source.

5. A scanner as in claim 4, wherein the optical element defines the phase tilt $\beta$ in accord with the following relationship:

$$\beta = (n-1)\alpha$$

where $\alpha$ is the angle between the figure of rotation and the first surface of the optical element, and n is the index of refraction of the optical element.

6. A scanner according to claim 4, wherein said optical element is a refractive linear axicon.

7. A scanner as in claim 1, wherein the phase tilt caused by the optical element relates to a spatial frequency $f_x$ of the information to be scanned as follows $$f_x = \frac{\pi \beta}{2.4 \lambda}$$

where $\beta$ is the phase tilt caused by the optical element and $\lambda$ is the wavelength of the beam emitted by the light source.

8. A scanner as in claim 7, wherein the optical element defines the phase tilt $\beta$ in accord with the following relationship:

$$\beta = (n-1)\alpha$$

where $\alpha$ is the angle between the figure of rotation and the second surface of the optical element, and n is the index of refraction of the optical element.

9. A scanner according to claim 7, wherein said figure is a refractive linear axicon.

10. A scanner as in claim 1, wherein the optical element and aperture are dimensioned in accord with the following relationship:

$$\frac{R_o \beta}{\lambda} < 3$$

where $\beta$ is the phase tilt caused by the optical element, the aperture limits the light passing through said optical element to a radius of $R_o$, and $\lambda$ is the wavelength of the beam of light emitted by the laser source.

11. A scanner as in claim 10, wherein the optical element defines the phase tilt $\beta$ in accord with the following relationship:

$$\beta = (n-1)\alpha$$

where $\alpha$ is the angle between the figure and the light receiving surface of the optical element, and n is the index of refraction of the optical element.

12. A scanner as in claim 10, wherein the optical element and aperture are further dimensioned in accord with the following relationship:

$$1 < \frac{R_o \beta}{\lambda}.$$

13. A scanner as in claim 10, wherein said aperture is a circular aperture of radius $R_o$.

14. A method for scanning a symbol, comprising the steps of:
(a) generating a collimated light beam and directing said light beam along a path toward a symbol to be read;
(b) moving said light beam to generate a scan line across said symbol to be read;
(c) modifying said light beam in the path toward said symbol to create a spot of light of a size correlated generally with the size of features of said symbol, said spot maintaining a substantially constant size for varying distances to said symbol, over a substantial range of said distances on an optical axis, the step of modifying including:
  (i) producing a phase tilt of the collimated beam of light inward toward the optical axis, and
  (ii) limiting the number of Bessel rings which surround a central lobe of the phase tilted beam of light.

15. A method according to claim 14, wherein said light beam is a laser light beam.

16. A method according to claim 14, wherein said step of producing a phase tilt includes directing said collimated light beam through a solid optical element having a substantially flat first surface and a second surface defined by a figure of rotation revolved about the optical axis, said figure of rotation being at an angle to said first surface.

17. A method according to claim 16, wherein said solid optical element is a refractive linear axicon.

18. A method according to claim 16, wherein said step of limiting the number of Bessel rings comprises limiting the radius of the collimated light beam passing through said solid optical element.

19. A method of scanning a symbol, comprising the steps of:
(a) generating a substantially monochromatic beam of collimated light;
(b) modifying the beam of light to create a beam spot of substantially constant diameter which extends along a predetermined distance along the path of said beam and which exhibits a predetermined diffraction pattern having a central lobe and a plurality of rings surrounding said central lobe;
(c) limiting the beam diffraction pattern to reduce the number of said rings surrounding said central lobe;
(d) directing the reduced beam diffraction pattern onto a symbol to be read; and
(e) moving the reduced beam diffraction pattern across the symbol to be read.

20. A method as defined in claim 19, wherein:
the step of modifying the beam of light comprises passing the beam of light through an optical element which produces a phase tilt of the collimated beam of light inward toward an axis of the optical element, and
the step of limiting the beam diffraction pattern comprises limiting the radius of the collimated beam of light passing through said optical element.

21. A method as defined in claim 20, wherein:
said optical element comprises a solid optical element having a substantially flat first surface and a second surface defined by a figure of rotation revolved about an axis perpendicular to said first surface, said figure being at an angle with respect to said first surface, and
the step of limiting the radius of the collimated beam of light passing through said optical element comprises passing the beam through an aperture to limit the beam to a predetermined radius.

22. A device for use in a system for reading optically encoded information, comprising:
(A) a light emitting module having a fore end portion from which light is emitted, said light emitting module comprising:
  (i) a light emitting element emitting light in a direction toward the fore end portion of the light emitting module,
  (ii) a first optical element for collimating and focusing the light from the light emitting element substantially to infinity, and
  (iii) first mounting means for mounting the first optical element along an axis of light emitted from the light emitting element at a point adjacent the fore end portion of the light emitting module; and (B) an assembly for mounting over the fore end portion of the light emitting module from which light is emitted, said assembly comprising:
- (i) a second optical element that will produce a phase tilt of the collimated light from the first optical element so as to cross the axis along a continuous line of points along a substantial extent of the axis,
- (ii) means for forming an aperture for limiting the light passing through the second optical element, and
- (iii) second mounting means for mounting the second optical element and the means for forming an aperture over the fore end portion of the light emitting module from which light is emitted.

23. A device as in claim 22, wherein said light emitting element is a laser.

24. A device as in claim 22, wherein said second optical element is a solid refractive optical element having a substantially flat surface and a surface defined by a figure of rotation revolved about an axis perpendicular to said substantially flat surface, said figure being at an angle with respect to said substantially flat surface.

25. A device as in claim 24, wherein said solid optical element is a linear axicon.

26. A device as in claim 22, wherein the second mounting means positions the aperture between the first optical elements and the fore end portion of the light emitting module.

27. A device as in claim 22, wherein the second mounting means positions the second optical element between the first optical element and the aperture and positions the aperture adjacent a surface of the second optical element from which light emerges.

28. A device as in claim 22, wherein the second means for mounting comprise a detachable mounting structure for removably supporting the second optical element and the means for forming an aperture over the fore potion of the light emitting module, said detachable mounting structure facilitating removal and replacement of said assembly.

29. A device for reading optically encoded information having varying light reflectivity, comprising:
- (A) a light emitting module having a fore end portion from which light is emitted, said light emitting module comprising:
  - (i) a light emitting element emitting light in a direction toward the fore end portion of the light emitting module,
  - (ii) a first optical element for collimating and focusing the light from the light emitting element substantially to infinity, and
  - (iii) first mounting means for mounting the first optical element along an axis of light emitted from the light emitting element at a point adjacent the fore end portion of the light emitting module;
- (B) an assembly for mounting over the fore end portion of the light emitting module from which light is emitted, said assembly comprising:
  - (i) a second optical element that will produce a phase tilt of the collimated light from the first optical element so as to cross the axis along a continuous line of points along a substantial extent of the axis,
  - (ii) means for forming an aperture for limiting the light passing through the second optical element, and
  - (iii) second mounting means for mounting the second optical element and the means for forming an aperture over the fore end portion of the light emitting module from which light is emitted;

means for producing a scanning motion of said beam of light across a portion of the information; and means for receiving light reflected back from the optically encoded information and producing electrical signals corresponding to the varying light reflectivity.

* * * * *